United States Patent [19]

Mason

[11] Patent Number: 4,905,500

[45] Date of Patent: Mar. 6, 1990

[54] PAPER WEB SURFACE CLEANER OR TESTER

[75] Inventor: Robert J. H. Mason, Burnaby, Canada

[73] Assignee: MacMillan Bloedel Limited, Burnaby, Canada

[21] Appl. No.: 287,064

[22] Filed: Dec. 21, 1988

Related U.S. Application Data

[63] Continuation-in-part of Ser. No. 174,442, Mar. 28, 1988, abandoned.

[51] Int. Cl.⁴ ........................ G01N 15/08; A47L 5/14

[52] U.S. Cl. ........................................ 73/38; 15/345

[58] Field of Search ........................ 73/38, 37.6, 37.7; 15/345

[56] References Cited

U.S. PATENT DOCUMENTS

| | | | |
|---|---|---|---|
| 2,919,573 | 1/1960 | Berkley et al. | 73/38 |
| 3,248,930 | 5/1966 | Speegle et al. | 73/38 |
| 3,775,806 | 12/1973 | Olbrant et al. | 15/345 X |
| 4,385,517 | 5/1983 | Sorce et al. | 73/38 |
| 4,594,748 | 6/1986 | Warfvinge | 15/345 X |
| 4,672,841 | 6/1987 | Schuster et al. | 73/38 |
| 4,730,481 | 3/1988 | Schlipf | 73/38 |

FOREIGN PATENT DOCUMENTS

| | | | |
|---|---|---|---|
| 1925860 | 12/1969 | Fed. Rep. of Germany | 15/345 |

OTHER PUBLICATIONS

'The Characterization of Offset Lint and the Testing of Offset Papers' by Browning and Parker from the Proceedings of the Symposium on Mechanical Pulp, Jun. 22-24, 1970 Oslo.

*Primary Examiner*—Hezron E. Williams
*Assistant Examiner*—Joseph W. Roskos

[57] ABSTRACT

A surface cleaner that may take the form of a surface strength tester or lint remover for paper wherein lint or like material is freed from the surface of a paper web travelling past the cleaner. The cleaner includes a material pick-up head having an air bearing surface through and along which an air stream is passed to generate an air bearing and a significant negative air pressure between the bearing surface and web. The negative pressure tends to hold the web and air bearing surface in close proximity to each other and causes lint material to be freed from the web surface. The freed lint material is carried in the air stream. A vacuumed pick up has its inlet opening located relative to the air bearing surface such that material freed and carried in the air stream is sucked into the inlet. If the cleaner is used as a tester the pickup head may extend over only a small portion of the web surface and the amount of material measured thereby to provide an indication of the linting propensity of the web. If the cleaner is to clean the surface of the web the pickup head will extend over substantially the full width of the web.

10 Claims, 5 Drawing Sheets

FIG. 11.
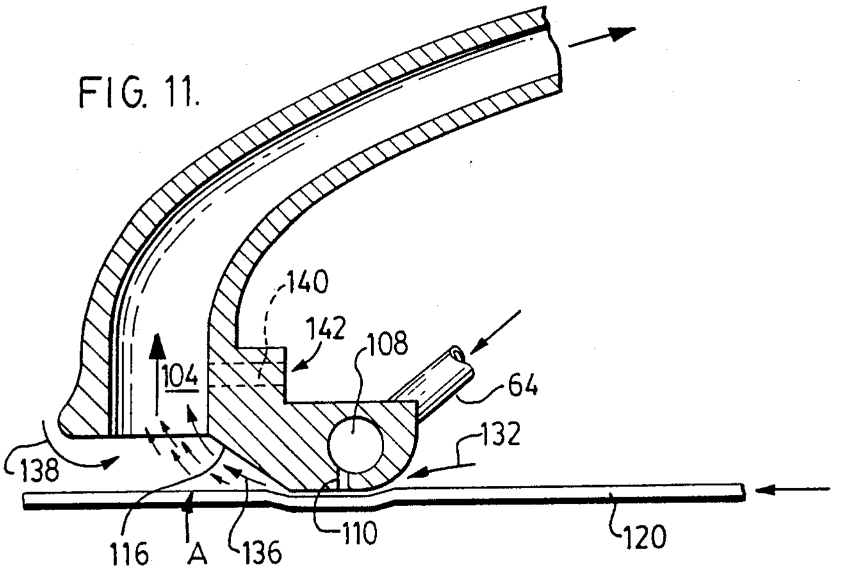
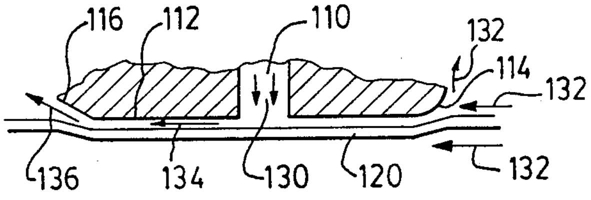
FIG. 11A.
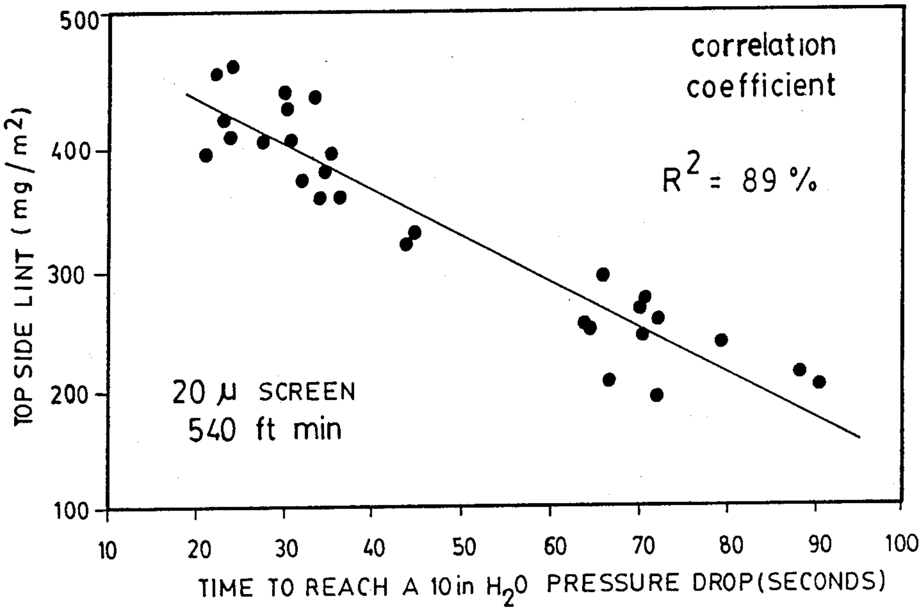
FIG. 12.

PAPER WEB SURFACE CLEANER OR TESTER

This application is a continuation-in-part of U.S. application Ser. No. 07/174,442 filed Mar. 28, 1988 now abandoned.

FIELD OF THE INVENTION

The present invention relates to a paper surface cleaner, more particularly the present invention relates to a pneumatic device for freeing and collecting materials dislodged from the surface of the web to clean the web surface or provide an indication of the surface strength of the paper.

BACKGROUND OF THE PRESENT INVENTION

The surface strength of web material particularly paper is generally determined off-line (off the paper machine) using some form of adhesive or sticky medium which is applied to the web and the amount of material removed from the surface of the web by the sticky material provides an indication of surface strength or linting propensity of the web.

One way of doing such a test is to use a commercial offset press (e.g. an Apollo press) the paper is printed and the amount of lint accumulating on the printing blanket over a period of time is measured to provide an indication of the linting propensity.

Other techniques are utilized for example, in one technique a wet blanket is moved against the web and over a period of time, the lint accumulated and doctored off the blanket, is filtered and weighed to provide an indication of the linting propensity. In another technique a steel roller wetted with a picking oil is used to pull lint from the web and the amount of lint accumulated on the roller over time is measured to provide an indication of linting propensity.

It is also known to apply a brushing action to the sheet, for example, over the impression roller and collect the lint freed from the web using a vacuum. This lint is subsequently weighed to provide an indication of linting propensity.

In another vacuum system lint is simply vacuumed from the web on the press stand using a vacuum nozzle to clean a given area of the paper surface, the lint so collected is then examined to provide an indication of linting.

Examples of pick tests include the Dennison wax process wherein tack graded waxes are used. The melted wax of a known tack is pressed firmly into the paper and then after solidifying is pulled away and the paper examined for defects. Papers are graded on the basis of the highest tack wax that can be used without damaging the sample.

The IGT (Instituut voor Grafiske Techniek) pick test is similar to an Apollo test in that it utilizes a small printing unit, however, in this case printing is done under controlled pressure and oil film thickness. The speed of printing is gradually increased. The printed strips are examined under a microscope to determine the speed at which the first sign of surface disruption occurred, i.e. at what speed is the paper able to be printed without surface disruption.

The GFL (Grafiska Forskning Laboratoriet i Sverige) test is similar to the IGT test but uses an inclined plane and a weighted printing roller to print a sheet. The printed sheet is then examined using low angle light to find the first signs of picking.

In a publication entitled 'The Characterization of Offset Lint and the Testing of Offset Papers' by Browning and Parker from the Proceedings of the Symposium on Mechanical Pulp held in Oslo June 22–24, 1970 various techniques or measuring linting characterization of a paper web are described and the effect of applying a brush and a vacuum to remove lint material from the surface of a paper web is described.

BRIEF DESCRIPTION OF THE PRESENT INVENTION

It is an object of the present invention to provide an on-line system removing linting material from a paper web and/or determining the surface strength characteristics of the fibrous web.

Broadly the present invention relates to a surface cleaner for cleaning at least a portion of a surface of a travelling paper web, said cleaner comprising a material pick-up head having an air bearing surface, means for directing air flow toward and along said at least a portion of said travelling web between said surface of said web and said bearing surface to generate an air bearing between said pick-up head and said surface of said web and a negative air pressure between said bearing surface and said web tending to hold said web and said bearing surface in close proximity to each other and tending to free material from said web and carry said material in said air flow, a suction pickup means having an inlet opening in a position relative to said means for directing airflow to receive said material freed from said web and carried in said air flow, said suction pickup means carrying said material away from said surface of said web.

If said cleaner is to provide a measure of linting propensity of the web, said cleaner further includes means to measure the amount of said material carried by said suction pickup means.

Preferably said means to measure measures the time to collect a preset amount of said material to provide said indication of surface strength of said web.

Preferably said means to collect the material will comprise a filter and the means for measuring the amount of material collected will comprise means for measuring the pressure drop across said filter and the time for a preset change in said pressure drop to occur to provide said indication of surface strength.

In a preferred arrangement the means for directing air flow will comprise a plurality of apertures aligned in at least one row extending substantially perpendicular to the direction of travel of the web and adapted to directed air to flow between said air bearing surface and said web. When said cleaner is used to determine surface characteristics of the web preferably a single row of apertures will be used.

Preferably when the tester is portable means will be provided to ensure that the air bearing surface is properly oriented to the web. Such means preferably will set the angle of the air jet means relative to the path of travel of the web.

A BRIEF DESCRIPTION OF THE DRAWINGS

Further features, objects and advantages will be evident from the following detailed description of the preferred embodiments of the present invention taken in conjunction with the accompanying drawings in which.

FIG. 11 is a schematic illustration of operation of the head of the present invention.

FIG. 11A is an enlarged schematic illustration of the air bearing portion of the collecting or pickup head.

FIG. 12 is a plot illustrating the correlation of one embodiment of the present invention with a recognized linting propensity test.

DETAILED DESCRIPTION OF THE PRESENT INVENTION

Figure 1:
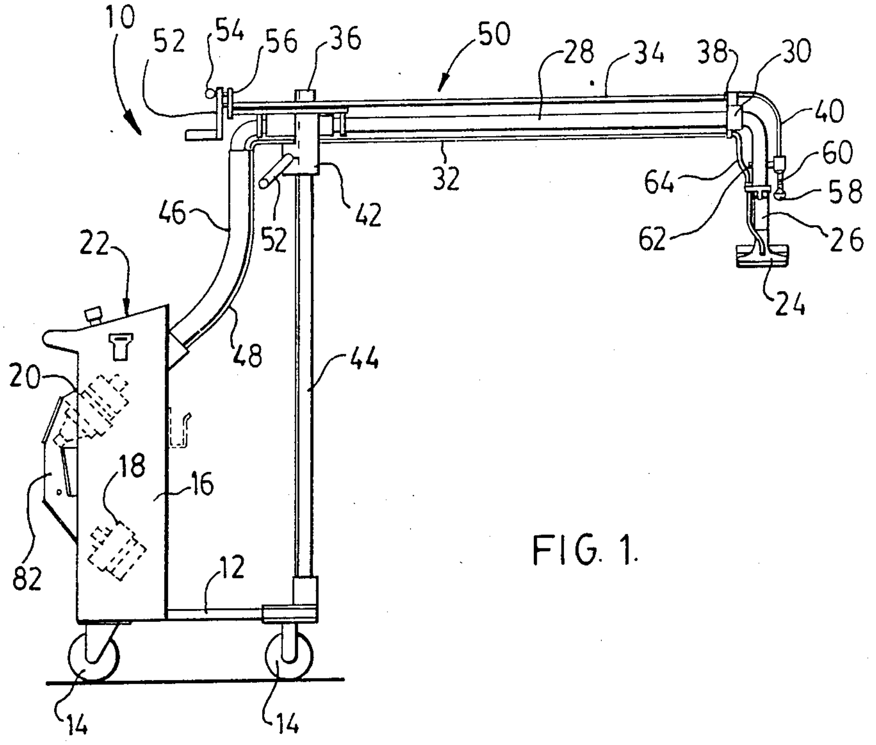
FIG. 1 is a side elevation of a portable unit cleaning a portion of the surface of a travelling web and includes equipment for measuring surface strength characteristics of the web.

The present invention which will first be described in relation to a portable unit for cleaning a limited amount of the surface of a paper web and particularly adapted for testing the linting propensity of a paper web. It will be recognized that, if desired, a permanent installation may be provided and those elements necessary for a portable unit and unnecessary for a fixed unit may be eliminated and further that the unit may be extended so that substantially the whole surface of the paper web is cleaned and thereby the linting propensity of the paper web reduced and if desired, measured.

The portable unit 10 particularly suited to measuring surface strength includes a base platform 12 mounted on wheels 14. A suitable structure 16 mounts the vacuum or suction generating unit (and a compressor if required—normally pressurized air will be available at the mill) schematically indicated at 18 and the filter unit 20 which separates the material from the airstream and means for measuring the amount of material collected. Suitable gauges in the like will be provided on an instrument panel as indicated at 22.

The material collecting head 24 which will be described in more detail herein below in the portable unit is mounted at the end of a mounting arm 26 which in turn is pivotally mounted at the free end of a cantilever pipe structure 28 by a swivel connection 30. The pipe 28 supports an air pressure line 32 therebelow as well as a shaft 34 that is rotatable about its longitudinal axis in bearings 36 and 38. The shaft 34 has a positioning arm 40 extending perpendicularly thereto from the end thereof adjacent the head 24.

The pipe 28 is connected to the filter 20 via a flexible hose 46 while the line 32 is connected to the compressed air source, e.g. the mill compressed air source or an on-board compressor and/or vacuum generator 18 by a flexible line 48.

The head assembly 50 which includes the head 24 cantilever pipe 28, shaft 34 and line 32, etc. is cantilever supported as above described and is freed for movement vertically along the column 44 by release of the locking pin 54 so that the vertical height of the pipe 28 and thus of the head 24 may be adjusted.

Shaft 34 is provided at its supported end, i.e. the end adjacent to column 44, with a handwheel 52 and a retractable locking pin 54 that cooperates with suitable notches in lock 56 so that the shaft 34 may be locked in selected angular positions into which it is rotated in bearings 36 and 38.

The support arm 40 is connected to a positioning ball 58 by an adjustable connection 60 (the adjustability of the connection 60 may be eliminated if the structure of the head 24 is fixed). Also connected to the positioning arm 40 is an abutment pin 62 which projects beneath the support arm 26 so that rotational movement of the shaft 34 rotates the arm 40 which in turn moves the abutment pin 62. Movement in one direction forces the abutment pin 62 to engage the underside of the support arm 26 and lifts same by pivoting about its connection 30 with the tube 28, i.e. rotate about the axis of the pipe 28 in one direction. Rotation of the shaft 34 in the opposite direction moves the support arm 40 and thus the support pin 62 away from the arm 26 and permits arm 26 to rotate on connection 30 in the opposite direction and follow the pin 62 until the head 24 contacts the web to be tested as will be described herein below. The shaft 34 may be rotated 360° to move to the opposite side of the arm 26 so the arm may be positioned to operate on a web travelling in the opposite direction.

The arm 26 is hollow thus connects the head 24 to the source of suction through the pipes 28 and 46.

The pressure line 32 is connected to the pressure manifold 108 in the head 24 (to be described herein below) by a suitable (Flexible) line 64 that permits the rotation of the arm 26 in the bearing 30 and angular adjustment of the head 24 around the axis of arm 26 to position the head for testing a web travelling in the opposite direction.

Figure 2:
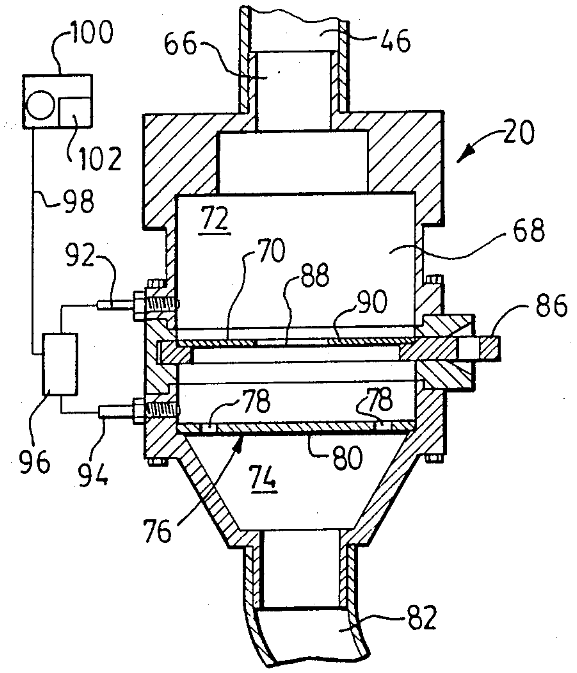
FIG. 2 is a section through a suitable filter unit for use in determining linting propensity.
Figure 3:
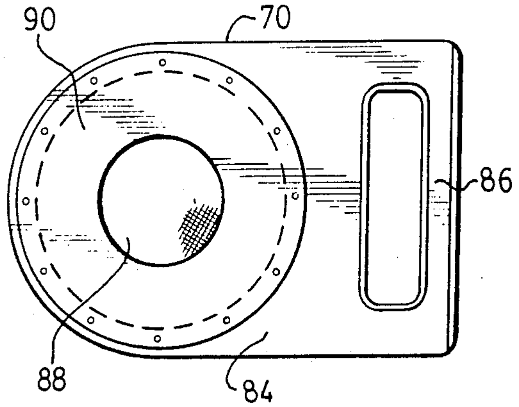
FIG. 3 is plan view of a filter element for the filter unit of FIG. 2.
Figure 4:
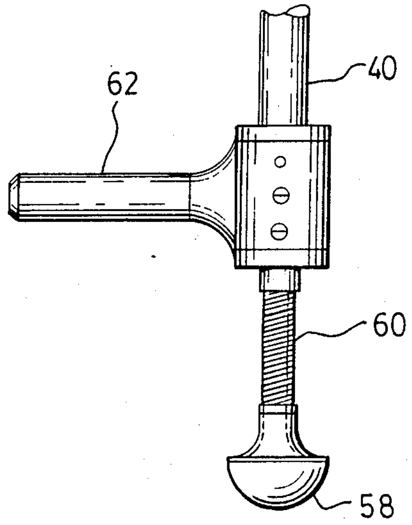
FIG. 4 is an illustration of positioning ball used with the portable unit for setting the angle of the material collecting or pickup head to the web surface.

Referring the FIG. 2 the filter 20 is connected to the flexible hose 46 via a nipple 66 and has an expanded internal chamber 68 which is divided by a filter 70 into an incoming compartment 72 and an exhausting compartment 74. The exhausting compartment 74 is baffled by a plate 76 having circumferentially spaced openings 78 and a central solid section 80 which disrupts the flow path of the air so that it must flow radially outward and then through the openings 78. The opposite end of the filter 20 is connected via a hose 82 to the suction unit 18.

Filter 70 in the illustrated arrangement is provided by a flat plate 84 having a handle 86. A filter disc 88 is held in position on the plate 84 by a mounting plate 90.

The center of the filter disc 88 is aligned with the center of the central portion 80 of the disc 76 and is smaller in diameter than the central portion 80 of the disc 76 so that flow of air from the chamber 72 to the chamber 74 passes first through the disc 88 and then radially outward to and through the passages 78 in the divider or the disc 76 and then out through the tubing 82 to the suction pump with the like 18.

The filter 20 is provided with a sensor inlet 92 located within the chamber 72 and a second sensor outlet 94 located in the chamber 74 between the disc 76 and the filter 70. The difference in pressure between the air in the incoming chamber 72 and in the outgoing chamber 74 is determined by the sensor 96, i.e. pressure drop across filter 88. The output of this sensor 96 is fed via the line 98 to a suitable control panels segment generally indicated at 100 which incorporates a timer 102 so that the time to reach a specified pressure drop or change in pressure drop across the filter 88 may be measured or alternatively, a change in pressure drop over a specified period of time may be measured to provide the indication of linting propensity for the web being tested.

It will be evident that the present invention as above described will be applied to a travelling web of paper to determine the linting propensity of the paper. Preferably the paper will be tested as it is being produced and before it is delivered to the printer. Generally the unit will be mounted to test the paper between the calender stack and the reel. The tester may also be used for example by the printer in a press room to determine linting propensity.

Figure 5:
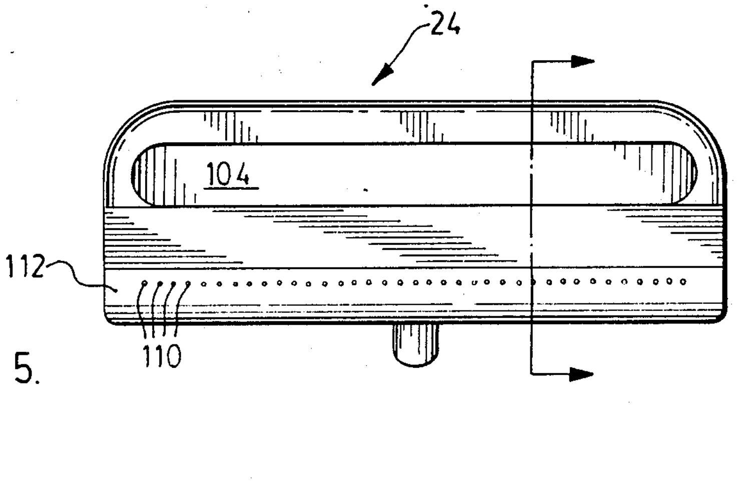
FIG. 5 is a bottom plan view of the pickup head illustrating the air outlets for directing air flow toward the web and the suction pickup.
Figure 7:
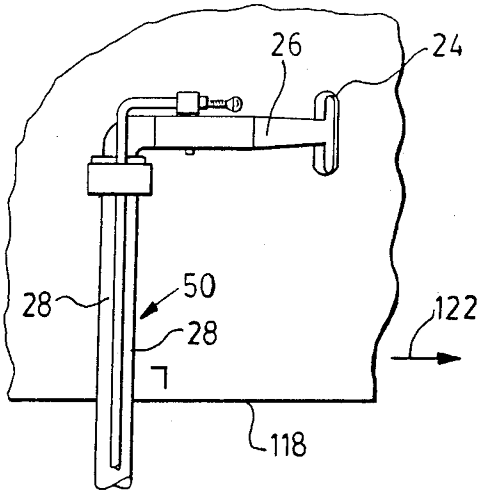
FIG. 7 is a plan view illustrating positioning of the material collecting head of the present invention.

Referring now to FIGS. 5 nd 6 the head 24 will be described in more detail. As shown the head 24 is provided with a suction inlet 104 that is connected to the hollow arm 26 which in turn is connected via the pipe 28, etc. to the filter 20 and then to the suction or vacuum generating unit 18 thereby to provide a suction means for collecting the lint freed from the web as will be described below.

Upstream of the suction inlet 104 in the direction of travel of the web is an air bearing means having a housing 106. The housing 106 is provided with a pressure manifold 108 which communicates through a plurality of uniform sized passages 110 leading to and opening on an air bearing surface 112. In the illustrated arrangement, the passages are arranged in a straight line or row substantially equal in length to the length of the mouth 104 of the suction pickup. In a preferred embodiment of the present invention the holes 110 are approximately 0.8 mm in diameter and are location on 2.5 mm centers.

The housing 106 has a curved oncoming side filleted as indicated at 114 and leading into the flat air bearing surface 112 through which the passages 110 open. On the leading side of the flat surface 112 in the direction of web travel is an inclined wall 116 leading to the mouth 104 of the suction or vacuum pickup. The angle of the wall 116 to the surface 112 is not critical however in the illustrated arrangement the angle A has been set to about 35°. Generally it is simply important that the wall 116 not obstruct the movement of material freed from the surface of the web from moving into the opening or mouth 104 of the suction pickup.

The holes or passages 110 are spaced between the fillet 114 and the wall 116 so that a substantial portion if not all the air introduced through passages 110 between the surface 112 and the web, passes between the surface 112 and web to wall 116. The relative movement between the head 24 and the paper web tends to insure air flow is predominantly toward the wall 116.

To operate the portable version of present invention the cantilevered arm assembly 50 is positioned so that the pipe 28 extends substantially perpendicular to the edge 118 of the paper 120 which is moving in the direction of the arrow 122. Initially the arm 26 is held in elevated position by the pin 62 on the support arm 40 engaging the undersurface of the arm 26. Shaft 34 is locked in position by the pin latch 54 on the handle 52 engaging with the lock 56 (FIG. 8).

Figure 8:
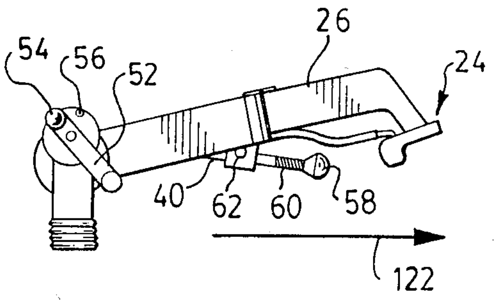
FIG. 8 is an end view of a portable unit illustrating the material collecting head being moved into position while being supported on a supporting and positioning arm.
Figure 9:
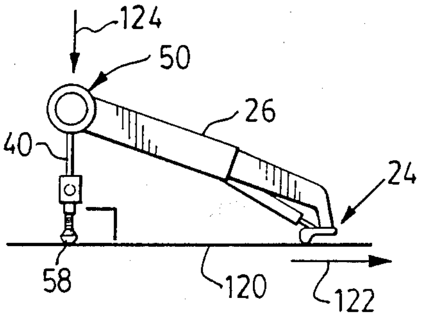
FIG. 9 is a view similar to FIG. 8 but showing the positioning arm pivoted into a position wherein the arm is substantially perpendicular to the path of travel of the web and the positioning ball at the free end of the arm just contacts the web surface to properly position the head relative to the path of travel of the web.

When the head 24 has been moved to the desired position laterally of the web 120 and the pipe 28 is positioned perpendicular to the edge 118 (which aligns the line of holes 110 leading from the pressure manifold 108 to the surface 112 of the head 24 to be substantially perpendicular to the direction of travel of the web 120 and the edge 118) the latch 54 is released and the shaft 34 is rotated in a clockwise direction as seen in FIG. 8 to move the pin 62 away from the bottom of the arm 26 and permit the head 24 to move into position resting on the upper surface of the web 120. Normally when the cantilever head structure 50 is moved into position it will be well above its operative position so that rotation of the support arm 40 to a position substantially perpendicular to the surface of the web 120, as shown in FIG. 9 may be accomplished and then the structure 50 lowered so that the surface of the ball 58 at the free end of the arm 40 just contacts the upper surface of the web 120, i.e. the head structure 50 is moved in the direction of the arrow 124 until the ball 58 just contacts the upper surface of the web 120 with the arm 40 substantially perpendicular to the upper surface of the web 120. This will place the flat surface 112 on the housing 106 of the head 24 substantially parallel to the path of travel of the upper surface of the web 120.

Air under relatively low pressure is applied to the head 24, i.e. to manifold 108 and passages 110 as the head is lowered into the position shown in FIG. 9 so that an air bearing is formed between the surface 112 and the web 120 to support the head 24 and arm 26 on the web 120. With the head 24 (surface 112) held closely adjacent the web air pressure is increased to generate a vacuum between the paper web and the surface !12 to hold the web 120 and surface in very close but slightly spaced relationship.

It will be apparent that once the angular relationship of the planer section 112 is determined the adjustment 60 can be fixed.

To determined the length of the arm 40 to the tip of the ball 58 the extendable connection 60 was adjusted to obtain maximal adherence between the head 24 and the surface of the web 120 when the air bearing was at operating pressure.

Figure 10:
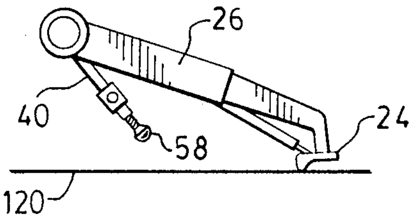
FIG. 10 is a view similar to FIG. 9 but showing the positioning arm retracted to a position where it will remain during operation.

After the height of the assembly 50 has been adjusted the shaft 34 is then turned (counter clockwise in the illustration) to move the ball 58 to the position shown in FIG. 10 wherein the pin 62 is clear of the bottom of the arm 26 and the ball 58 no longer contacts the surface of the web 120 and is locked in this position by the locking pin 54 cooperating with the lock 56.

In the operation as above described air pressure is first applied to the manifold 108 in housing 106 through the lines 64, 32, 48, etc. so that air passes out through the passages 110 and forms an air bearing as indicated at 130 between tee surface 112 and the web 120. As is well known boundary air as indicated by the arrows 132 travels with the web 120. It has been found that air pressure ranging from about 5 to 10 psi to well over 40 psi in manifold 108 will function effectively however, it is preferred to operate with the higher air pressure (about 30 to 40 psi) in the chamber manifold 108, which causes air to flow at high velocity as indicated by the arrows 134 (FIG. 1!A) between the web 120 and surface 112 in relatively fixed spaced relationship to provide an air bearing and causing disruption on the adjacent surface of the web 120 and dislodging loose material (lint) therefrom. The dislodged material is carried in the high velocity airstream 134 and as indicated by arrow 136 into the suction opening 104 and then through the hollow arm 26, pipe 28 and flexible hose 46 into the filter 20.

Some air enters the inlet 104 by flowing around the leading end of the inlet as indicated by the arrow 138.

Figure 6:
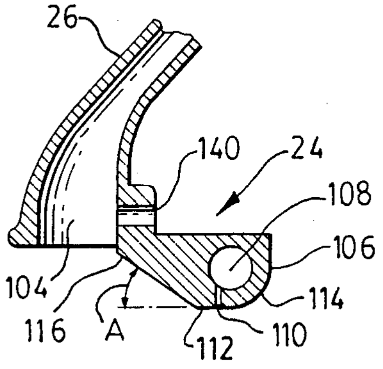
FIG. 6 is a section along the lines 6—6 of FIG. 5.

Suitable apertures as indicated at 140 (FIG. 6 and 11) direct air flow into the passage in arm 26 as indicated by the arrow 142 which flow tends to direct the air flow illustrated by arrow 136 away from surface 116 and inhibit deposition of material (lint) on the surface 116 and better insure the lint is carried into the inlet 104.

The material separated from the web 120 as above indicated and carried via the pipe 28 and flexible hose 46 into the filter 20 are then separated from the airstream by the filter 88. By measuring the time for a given change pressure drop across the filter, linting propensity of a paper sheet can accurately be established.

FIG. 12 illustrates the correlation of the operation of the present invention with a conventional test made on a small commercial press (an Apollo press). The present invention utilizes a 20 micron standard filter screen (filter 88) and the time to reach 10 inches water pressure drop across the filter 88 was determined. The web speed was about 11.5 meters per minute and the air pressure was 40 psi (2.8 kg/cm$^2$) in the manifold 108.

It will be apparent that almost a 90% co-efficient of correlation between the Apollo press and the present invention was achieved.

The preferred technique is to measure the time to reach given pressure across the filter 88, but meaningful results would also be obtained by measuring the pressure drop after a preset time or measuring the amount of lint collected over a preset time.

It will be apparent that the pressure in the chamber 108 and the vacuum applied through the vacuum inlet 104 should be substantially constant for each test if meaningful results are to be obtained in particular if the results are to be compared.

The screen size for the filter 88 must also be selected for optimum results with a particular paper machine and furnish. !t has been found that a mesh size of about 41 microns gives good results with a fairly wide variety of furnishes.

It will be apparent that in a fixed installation many of the adjusting and mounting features will be unnecessary and may be eliminated. Similarly it may be desirable to move a portable tester from one side of the machine to the other which will require the head to rotate 180° around the axis of arm 26 and rotation of the arm 40 relative to the arm 26 to position the pin 62 on the opposite side of the arm 26.

The linting propensity tester described above was converted into a cleaner for cleaning substantially the whole surface of the paper web and thereby reducing the linting propensity of the paper for subsequent use. To accomplish this the cleaning head 24 was extended longitudinally to substantially the full width of the paper web to be cleaned and thus substantially the whole surface of the web was cleaned.

Figure 13:
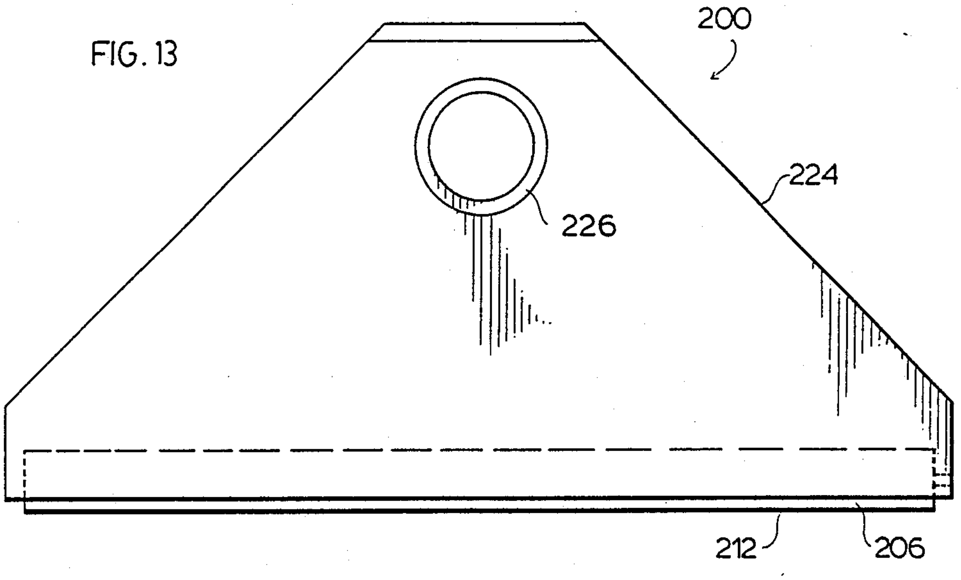
FIG. 13 is a side elevation of a cleaning head adapted to clean the full width of a paper web and FIG. 14 is an end elevation of the cleaning head of FIG. 13.
Figure 14:
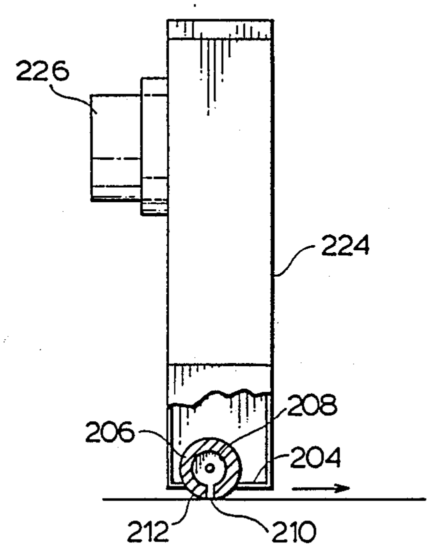

One embodiment of the device for cleaning the whole surface of the web is illustrated in FIG. 13 and 14. In the illustration equivalent parts to the head 24 have been indicated with the same last 2 digits as those above described but in the 200 series. The housing 206 has a manifold 208, an air bearing surface 212 with a row of passages 210 extended substantially the full width of the paper web. The suction inlet 204 for the suction pickup also extends the full width of the paper. A second suction inlet 204A is provided on the upstream side of the manifold 208 so that any lint material or other material separated from the web by flow of air in the reverse direction would also be carried away by the suction pickup means. In this arrangement a substantially circular housing 206 was used (substantially as illustrated in FIG. 13 and 14) so that the surface 212 was an arc of a circle. This was a trial device to determine if the concept would be effective for lint removal and the final revision surface 212 may more closely approximate the surface 112.

The illustrated device of FIG. 13 and 14 was operated in substantially the same manner as the surface strength tester described above but instead of the separated material being collected and measured to determine the linting propensity the material was separated from the air stream in a conventional manner so it could then be used as desired for example measured to determine surface strength or recirculated into the pulp stream.

When the unit of FIG. 13 and 14 was used to clean before printing, the whole surface of a travelling web, the following results were obtained.

TABLE I

APOLLO PRESS LINT WEIGHTS WITH AND WITHOUT CLEANING ON THE PRESS

| Roll # | | Lint on Blanket mg | Lint in Ink Train mg | Total Lint mg | Total Coarse Lint, mg |
|---|---|---|---|---|---|
| | With Cleaning | 220 | 106 | 326 | 7 |
| 1 | Without Cleaning | 294 | 178 | 472 | 14 |
| | % Removal | 25 | 40 | 31 | 50 |
| | With Cleaning | 161 | 66 | 227 | 7 |
| 2 | Without Cleaning | 214 | 80 | 294 | 6 |
| | % Removal | 25 | 18 | 23 | 0 |
| | With Cleaning | 186 | 71 | 257 | 1 |
| 3 | Without Cleaning | 220 | 81 | 301 | 3 |
| | % Removal | 15 | 12 | 15 | 67 |
| | With Cleaning | 119 | 41 | 160 | 1 |
| 4 | Without Cleaning | 133 | 58 | 191 | 1 |
| | % Removal | 11 | 29 | 16 | 0 |

In the above tests roll number 1 was tested at a speed of 100 feet per minute while the remaining rolls were tested at 2,500 feet per minute.

It will be evident that the present invention consistently significantly reduces the linting material in the sheet by at least about 15% based on total lint. Obviously this will depend on the particular paper being cleaned and as is apparent from the results the speed of the paper relative to the cleaning head, but generally removes a significant amount of The cleaning head 224 may be positioned in any suitable location on the paper machine, winder or printing press, etc.

Having described the invention modifications it will be evident to those skilled in the art without departing from the spirit of the invention as defined in the appended claims.

I claim:

1. A surface cleaner for removing material from a surface of a fibrous web travelling therepast, said cleaner comprising a material collecting head having an air bearing surface, means to mount said head with said air bearing surface biased against and into close proximity to said surface of said fibrous web, means for directing air flow out through said air bearing surface and in a direction toward said surface of said web, said air flow changing direction and passing between said air bearing surface and said surface of said travelling web as said web traverses said air bearing surface to form an air bearing between said head and said web and a negative air pressure between said bearing surface and said surface of said web to hold said web in close proximity to said air bearing surface whereby said web substantially conforms to the shape of a significant portion of said air bearing surface, said air flow between said bearing surface and said surface of said web freeing said material form said web and carrying said freed material in said air flow from between said bearing surface and said surface of said web, suction pickup means having an inlet downstream of said air bearing surface in the direction of travel of said web and spaced from said web in a position to receive atmospheric air and said air flow leaving said air bearing surfaces from between said bearing surface and said surface of said web carrying said material freed from said web.

2. A cleaner as defined in claim 1 further comprising means to collect said material received by said suction pickup means and means to measure the amount of said material collected to provide a surface strength tester that provides an indication of the surface strength of said web.

3. A cleaner as defined in claim 2 wherein said means to measure measures the time to collect a preset amount of said material.

4. A cleaner as defined in claim 3 wherein said means to collect includes a filter and said means to measure includes means to measure the pressure drop across said filter to determine said preset amount.

5. A cleaner as defined in claim 4 wherein said means for directing air flow through said bearing surface comprises a plurality of apertures aligned in a row substantially perpendicular to said direction of travel of said web and adapted to direct spaced jets of air against said web to form said air bearing and to generate said negative pressure and to free said material from said web.

6. A cleaner as defined in claim 3 wherein said means for directing air flow through said bearing surface comprises a plurality of apertures aligned in a row substantially perpendicular to said direction of travel of said web and adapted to direct spaced jets of air against said web to form said air bearing and to generate said negative pressure and to free said material from said web.

7. A cleaner as defined in claim 2 wherein said means to collect includes a filter and said means to measure includes means to measure the pressure drop across said filter and said means to measure includes means to measure the pressure drop across said filter and time required to reach a preset change in said pressure drop.

8. A cleaner as defined in claim 7 wherein said means for directing air flow through said bearing surface comprises a plurality of apertures aligned in a row substantially perpendicular to said direction of travel of said web and adapted to direct spaced jets of air against said web to form said air bearing and to generate said negative pressure and to free said material from said web.

9. A cleaner as defined in claim 2 wherein said means for directing air flow through said bearing surface comprises a plurality of apertures aligned in a row substantially perpendicular to said direction of travel of said web and adapted to direct spaced jets of air against said web to form said air bearing and to generate said negative pressure and to free said material from said web.

10. A cleaner as defined in claim 1 wherein said means for directing air flow through said bearing surface comprises a plurality of apertures aligned in a row substantially perpendicular to said direction of travel of said web and adapted to direct spaced jets of air against said web to form said air bearing and to generate said negative pressure and to free said material from said web.

* * * * *